US008493966B2

(12) United States Patent
Bendelac

(10) Patent No.: US 8,493,966 B2
(45) Date of Patent: Jul. 23, 2013

(54) OPTIMIZED PACKET PROCESSING ARCHITECTURE FOR BATTERY POWERED MOBILE COMMUNICATION DEVICE

(75) Inventor: Gil Bendelac, Ra'Anana (IL)

(73) Assignee: Marvell International Ltd., Hamilton (BM)

( * ) Notice: Subject to any disclaimer, the term of this patent is extended or adjusted under 35 U.S.C. 154(b) by 956 days.

(21) Appl. No.: 12/047,987

(22) Filed: Mar. 13, 2008

(65) Prior Publication Data
US 2009/0059899 A1   Mar. 5, 2009

Related U.S. Application Data

(60) Provisional application No. 60/894,540, filed on Mar. 13, 2007.

(51) Int. Cl.
*H04B 7/005* (2006.01)
(52) U.S. Cl.
USPC .......................................... 370/352; 455/445
(58) Field of Classification Search
USPC .. 370/352, 466, 349, 401, 230, 445; 455/419, 455/260, 436, 426.1; 701/35; 709/227, 223, 709/207; 345/156; 340/5.54; 713/324, 340
See application file for complete search history.

(56) References Cited

U.S. PATENT DOCUMENTS

| | | | | |
|---|---|---|---|---|
| 6,167,333 A * | 12/2000 | Gehlot | ............................. | 701/35 |
| 6,411,615 B1 * | 6/2002 | DeGolia et al. | ................ | 370/352 |
| 6,587,684 B1 * | 7/2003 | Hsu et al. | ....................... | 455/419 |
| 7,068,676 B1 * | 6/2006 | Sugaya et al. | ................. | 370/445 |
| 7,269,629 B2 * | 9/2007 | Zmudzinski et al. | ......... | 709/207 |
| 7,474,650 B2 * | 1/2009 | O'Neill | .......................... | 370/349 |
| 7,787,439 B1 * | 8/2010 | Oz et al. | .......................... | 370/352 |
| 7,787,443 B2 * | 8/2010 | Varney et al. | .................. | 370/352 |
| 7,953,407 B1 * | 5/2011 | Makipaa | ..................... | 455/426.1 |
| 7,957,279 B2 * | 6/2011 | Ben-Dvora et al. | ........... | 370/230 |
| 7,957,403 B2 * | 6/2011 | Jansson | .......................... | 370/401 |
| 8,006,110 B2 * | 8/2011 | Ober | .............................. | 713/324 |
| 2002/0009983 A1 * | 1/2002 | Pritchett et al. | ............... | 455/260 |
| 2003/0135622 A1 * | 7/2003 | Anderson et al. | .............. | 709/227 |
| 2004/0017824 A1 * | 1/2004 | Koenck et al. | ................. | 370/466 |
| 2005/0021728 A1 * | 1/2005 | Sugimoto | ...................... | 709/223 |
| 2005/0144495 A1 * | 6/2005 | Nakajima et al. | ............. | 713/340 |
| 2005/0190709 A1 * | 9/2005 | Ferchland et al. | ............ | 370/311 |
| 2006/0116127 A1 | 6/2006 | Wilhoite et al. | | |
| 2007/0004436 A1 | 1/2007 | Stirbu | | |
| 2007/0060125 A1 * | 3/2007 | Rahim | .......................... | 455/436 |
| 2007/0115258 A1 * | 5/2007 | Cupps et al. | .................. | 345/156 |
| 2011/0156866 A1 * | 6/2011 | Denison et al. | .............. | 340/5.54 |

FOREIGN PATENT DOCUMENTS

JP  10312370 A  * 11/1998

OTHER PUBLICATIONS

Supplementary European Search Report mailed on Aug. 11, 2010 from related European Application No. EP08835069.
XP-001541426"CoolSpots: Reducing the Power Consumption of Wireless Mobile Devices with Multiple Radio Interfaces" pp. 220-232.
Office Action issued by the State Intellectual Property Office of the People's Republic of China for Application No. 200880016075.1, dated Aug. 25, 2011.

* cited by examiner

*Primary Examiner* — Asad Nawaz
*Assistant Examiner* — Parth Patel

(57) ABSTRACT

A transceiver includes a peripheral device, a first processor configured to control an operation of the peripheral device, at least one second processor configured to transport data between the transceiver and at least one wireless network, and a third processor connected between the first processor and the at least one second processor. The third processor is configured to control the at least one second processor for executing a network operation independently of the first processor.

18 Claims, 6 Drawing Sheets

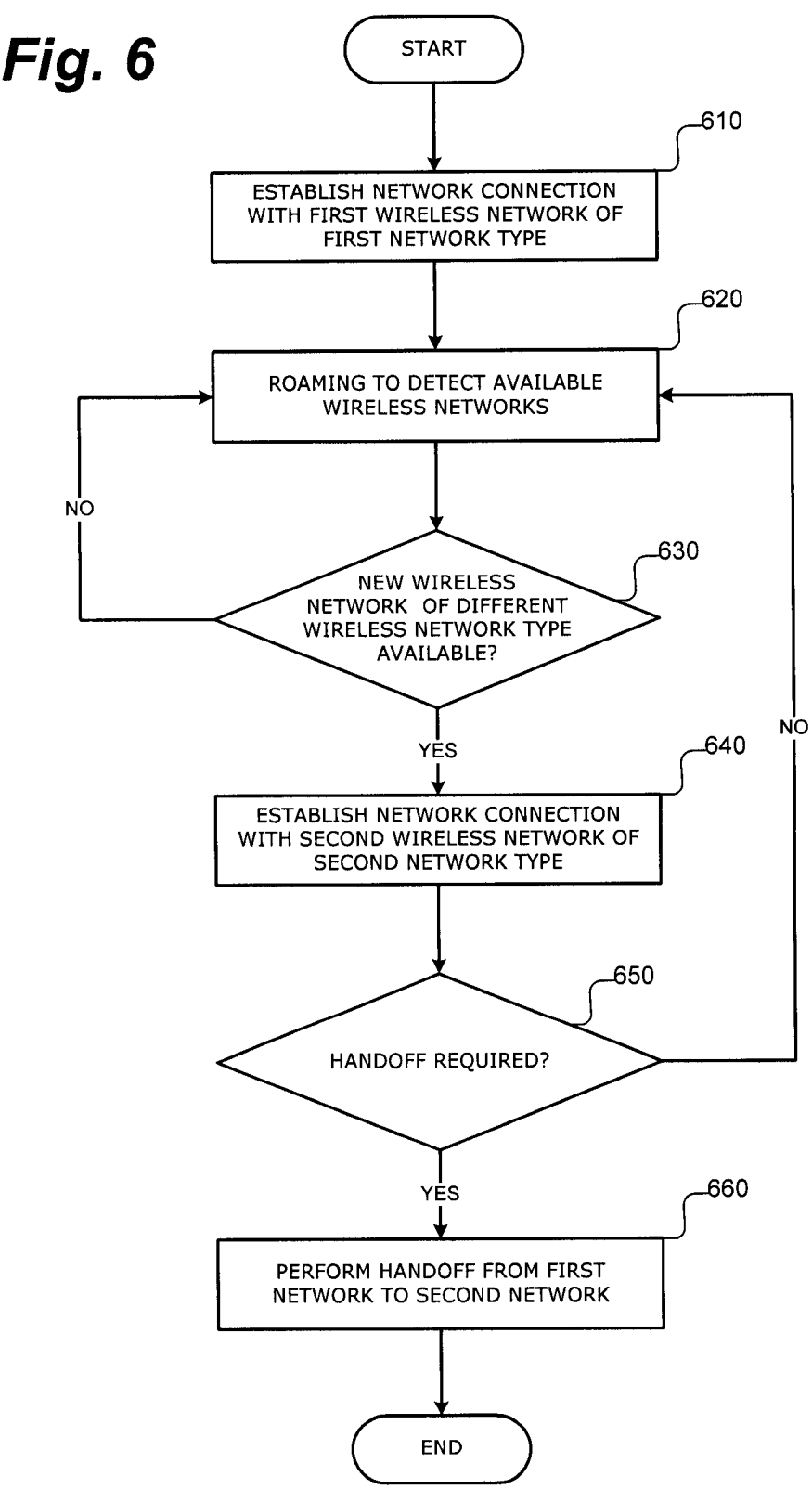

OPTIMIZED PACKET PROCESSING ARCHITECTURE FOR BATTERY POWERED MOBILE COMMUNICATION DEVICE

CROSS REFERENCE TO PRIOR APPLICATIONS

This application claims priority and the benefit thereof from a U.S. Provisional Application No. 60/894,540 filed on Mar. 13, 2007, which is hereby incorporated by reference for all purposes as if fully set forth herein.

BACKGROUND

1. Field

This disclosure relates to mobile communication devices, and particularly to an optimized packet processing apparatus, method and system that are useful for battery-powered mobile communication devices.

2. Related Art

Recently, remarkable advancements have occurred in the packet-switched (PS) communication technologies. Communication devices, such as Voice over Internet Protocol (VoIP), which use PS communication technology, are increasingly replacing traditional circuit-switched (CS) communication devices for interpersonal communication and man-machine service delivery. Multimedia content services will be delivered to wireless and wired terminals over IP Multimedia Subsystem (IMS) networks using Session Initiation Protocol (SIP) or other IP based protocols, including, for example, Real-time Transport Protocol (RTP) and User Datagram Protocol (UDP).

As interpersonal communication and man-machine service delivery are increasingly performed over IP communication technology connections, it becomes increasingly important to efficiently process IP packets on battery-powered wireless mobile devices. With available multimedia content data becoming richer, the underlying data rates necessary to transport the data increase significantly. Accordingly, new hardware architectures are required to support these requirements.

SUMMARY

In one aspect of the disclosure, a transceiver includes a peripheral device, a first processor configured to control an operation of the peripheral device, at least one second processor configured to transport data between the transceiver and a wireless network, and a third processor connected between the first processor and the at least one second processor. The third processor may be configured to control the at least one second processor for executing a network operation independently of the first processor.

According to another aspect of the disclosure, a method for maintaining a network connection between a transceiver and a wireless network, includes establishing a network connection between a transceiver and a wireless network, allowing an application processor, which controls operations of at least one peripheral device, to enter a low power mode when the transceiver is in an idle state, and maintaining the network connection using a network processor to control a communication processor for sending periodic messages to the wireless network without awakening the application processor from the low power mode.

In yet another aspect of the disclosure, a method for operating a transceiver configured to connect to a plurality of wireless networks of different network types, includes establishing a network connection between a transceiver and a first wireless network of a first network type using a first communication processor controlled by a network processor, detecting a second wireless network of a second network type using a second communication processor controlled by the network processor, the network processor coupled to the first communication processor, the second communication processor and an application processor provided in the transceiver, and performing a handover operation from the first wireless network to the second wireless network using the network processor to control the first communication processor and the second communication processor for the handover operation.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings illustrate embodiments of the disclosure, and together with the detailed description serve to explain teaching principles of the disclosure. No attempt is made to show structural details of the disclosure any more detail than may be necessary to understand teaching principles and elucidate examples of various ways in which it may be practiced. In the drawings:

FIG. 6 shows a flow chart of a process for performing a hand-off operation between one network type and another network type, in accordance with an embodiment of the disclosure.

DETAILED DESCRIPTION

Figure 1:
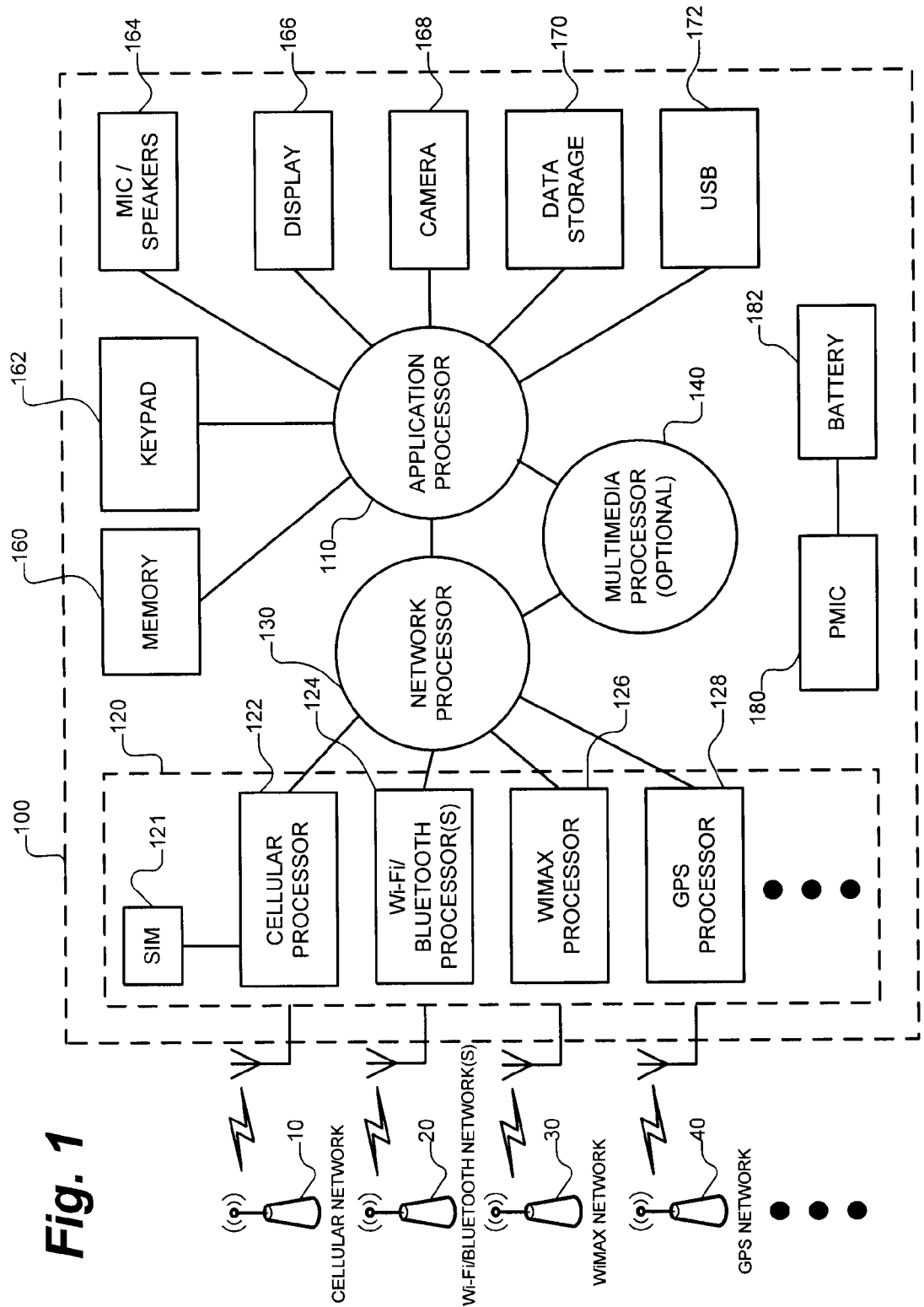
FIG. 1 shows an optimized packet processing architecture for a battery-powered mobile communication device, constructed in accordance with an embodiment of the disclosure.

The embodiments of the disclosure and various features thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure teaching principles of embodiments described herein. The examples used herein are intended merely to facilitate an understanding of ways in which embodiments of the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

In communications systems, to stay connected to a network and be able to receive incoming calls or instant messages, a mobile communication device is required to periodically send an IP message (e.g., a "keep alive" message) to a network to assure that it is still connected and registered. Without such "keep alive" IP messages, the network may assume that the mobile device has been disconnected and the IP address used by the mobile device may be released and reassigned to a pool to be assigned to another user. In IP multimedia subsystem (IMS) network using conventional handset architecture, this is accomplished by sending a special Session Initiation Protocol (SIP) message from the mobile communication device, which requires a main application processor and its operating system (e.g., a full fledged operating system (FFOS)) to awaken from a sleep during idle mode. Once a SIP message has been sent to the network, the operating system may again try to transition to sleep during the idle mode, followed by the main application processor itself going into idle mode. This process may take hundreds of milliseconds and is therefore not very efficient with regard to power consumption. To address this issue, according to teaching principles of the disclosure, a separate network processor may be implemented in battery powered mobile communication devices to take charge of the network functions.

FIG. 1 shows an optimized architecture for a battery powered mobile communication device 100, such as a mobile user equipment for a cellular communications network 10 constructed and arranged in accordance with an embodiment of the disclosure. The mobile communication device 100 may be any type of mobile communication device, such as, but not limited to, for example, a cellular telephone device, a voice-over-IP (VoIP) telephone device, a personal data assistant (PDA), a portable computer device, or any other device capable of communicating information, as the skilled artisan will readily recognize and/or appreciate without departing from the scope or spirit of the disclosure.

The mobile communication device 100 may include a plurality of processors and peripheral devices, including, but not limited to, for example, processors such as an application processor 110, a radio block 120 including a subscriber identity module (SIM) 121 and one or more communication processors 122, 124, 126, 128 (i.e., a cellular processor 122, a Bluetooth and/or Wi-Fi processor 124, a WiMAX processor 126, a GPS processor 128, and the like), a network processor 130 and an optional multimedia processor 140. The peripheral devices may include a memory 160, a keypad 162, a microphone and speaker 164, a display 166, a camera 168, a data storage device 170, a USB port 172 and the like. The SIM 121, which stores a service-subscriber key for the cellular network 10, may be connected to the cellular processor 122. The mobile communication device 100 may further include a power management integrated circuit (PMIC) 180 and a battery 182.

The application processor 110 may be a high-performance, high-frequency general purpose CPU that controls the overall operations of the system 100. The application processor 110 may run a full fledged operating system (FFOS) such as, e.g., SymbianOS™, Windows Mobile™, embedded Linux™, and the like. The application processor 110 may control the optional multimedia processor 140, which may be provided for processing primitive audio/video functions. Further, the application processor 110 may be configured to control the peripheral devices, such as, for example, the memory 160, the keypad 162, the microphone and speaker 164, the display 166, the camera 168, the data storage device 170, the USB port 172 or the like. The memory 160 may be a random access memory (RAM), a read only memory (ROM), a low latency nonvolatile memory (such as, e.g., a flash memory) or any other suitable electronic data storage as the skilled artisan will appreciate without departing from the scope or spirit of the invention. The data storage 170 may be configured to store data in a nonvolatile manner such as, but not limited to, for example, an optical and/or magnetic storage device, including a hard disk drive and a removable data storage. The application processor 110 may include software for processing GPS data.

During normal operation, such as, for example, when the mobile communication device 100 is used to make a phone call, play music, capture images, stream video, play games, download emails, transfer files or browse the Internet, the application processor 110 consumes a certain amount of power, which may range from, e.g., about 10 mW to about 1800 mW. For example, the application processor 110 may refresh the display 166 fifty times per second. For a music playback operation, the application processor 110 may process a frame about every 10 msec. To remain in the idle mode, but able to receive incoming calls, periodic processing may be required, e.g., every 2.5 msec. To maximize a battery life, it may be desirable to keep the application processor 110 off as long as possible, except, e.g., to refresh the display 166, to reduce power consumption to a minimum amount, such as, for example, about 10 mW.

To minimize power consumption, heat dissipation and the like, the network processor 130 may be provided external to and functionally isolated from the application processor 110. For example, as shown in FIG. 1, the network processor 130 may be located between the application processor 110 and the communication processors 122, 124, 126, 128. The network processor 130 may be configured to control the communication processors 122, 124, 126, 128 to execute network-related operations, such as authentification, registration, roaming to identify new networks, connectivity maintenance (e.g., periodic sending of "Keep Alive" messages), encryption protocol (e.g., TCP/IP, PTP), adaptations required for coexistence of different RF devices, hand-off between cellular networks, and/or the like, which conventionally would have been processed by the application processor 110. An example of a connectivity maintenance process is described below with reference to FIG. 5.

The network processor 130 may also be configured to control the communication processors 122, 124, 126, 128 to perform a hand-off operation from one network type to other network types (e.g., from a cellular network to a WLAN network). An example of a hand-off process between networks of different types is described below in detail with reference to FIG. 6.

Further, the network processor 130 may include a low power CPU that is enhanced with an encryption/decryption engine and with special packet handling instructions to more efficiently execute network operations. For example, the network processor 130 may include a dedicated packet processing hardware engine to process data packets transported in and out of the mobile communication device 100 via the communication processors 122, 124, 126, and/or 128. Also, the network processor 130 may include a trusted engine for storing secret information, such as, but not limited to, for example, encryption keys, certificates of authentication data and the like. Furthermore, the network processor 130 may be in charge of transporting data packets via a DMA (not shown) to the USB port 172.

In an embodiment of the disclosure, the network processor 130 may store an instruction to calculate a cyclic redundancy check (CRC) of a memory buffer in a single cycle, or a few instructions to decompose and compose packet fields, perform the Advanced Encryption Standard (AES) algorithm on data buffers, and the like. Furthermore, the network processor 130 may be configured to prevent non-trusted applications, such as, but not limited to, for example, applications downloaded from the Internet, from accessing the stored secret data or improperly using the decryption keys. Such security features may be beneficial when a user wants to access or use prime multimedia content that complies with Digital Rights Management (DRM) protocols.

Further, the network processor 130 may be configured to control the communication processors 122, 124, 126, 128 to perform periodic roaming operations, searching for new networks, monitoring the link quality of all active wireless networks, registering the handset to new networks if desirable, as well as controlling and performing handover between different types of networks if permitted, to maintain the best active connection at any time or to meet specific operator or user requirements such as, for example, lower cost connection or particular network connections such as low cost connections or particular network connections required for specific applications or multimedia services. Particularly, the network processor 130 may be configured to control communication processors 122, 124, 126, 128 to facilitate reliable and timely handovers between two different types of wireless networks, without losing voice or data service continuity.

This distributed architecture of the disclosure has several advantages over a centralized architecture, where a main application processor controls the overall operations of the system including performing all necessary network-related operations in addition to controlling communications processors and peripheral devices. During a normal operation (or active) mode, the network processor 130 may take a substantial amount of processing burden from the application processor 110. By configuring the network processor 130 to control the communication processors 122, 124, 126, 128 for executing all of the network-related operations for the mobile communication device 100, the application processor 110 may run at low operating frequencies, thereby consuming less power and generating less heat. Furthermore, the data packets processed by the communication processors 122, 124, 126, 128 under the control of the network processor 130 may be directly streamed to the multimedia processor 140 for further processing, thereby reducing the application processor 110's processing burden and power consumption even more.

Figure 2:
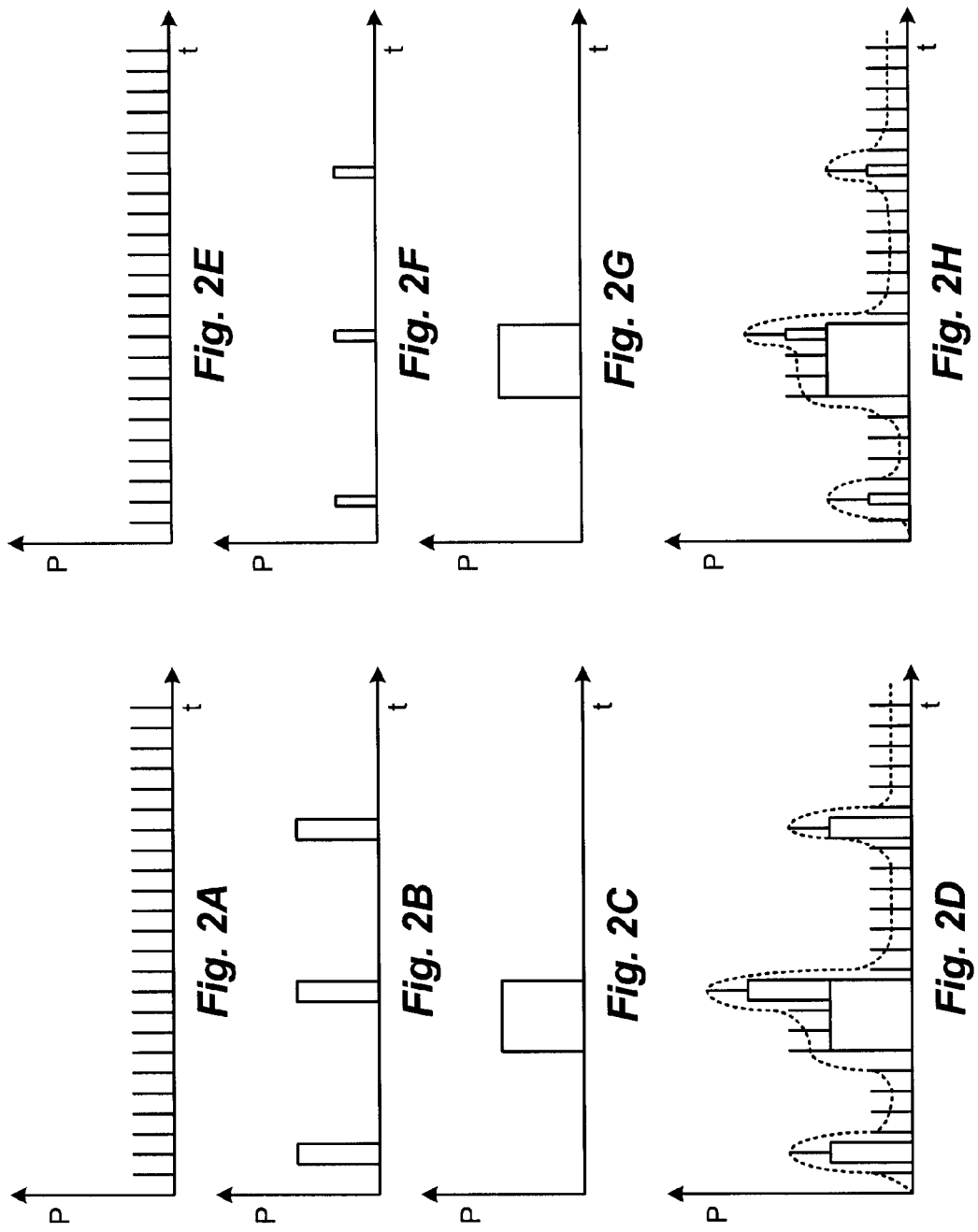
FIGS. 2A, 2B, 2C and 2D show power consumption diagrams in various operational modes of a battery-powered mobile communication device, in which an application process is configured to process network-related operations.
FIGS. 2E, 2F, 2G and 2H show power consumption diagrams in various operational modes of a battery-powered mobile communication device, constructed in accordance with an embodiment of the disclosure, in which a network device is provided external to an application processor for processing the network-related operations.

For example, FIGS. 2A, 2B, 2C, 2D, 2E, 2F, 2G and 2H show power consumption comparison diagrams. Particularly, FIGS. 2A, 2B, 2C and 2D show power consumption diagrams in various operational modes of a conventional mobile communication device, in which the overall operations of the device, including performing all necessary network-related operations, are performed by the application processor. FIGS. 2E, 2F, 2G and 2H show power consumption diagrams in various operational modes of a mobile communication device according to an aspect of the disclosure, in which a network processor, such as the network processor 130 shown in FIG. 1, is provided external to and isolated from an application processor for controlling the communication processors 122, 124, 126, 128 for processing the network-related operations. In other words, the network processor may be, for example, a partitioned portion of the same semiconductor device (such as, e.g., a silicon device), a separate semiconductor device mounted on the same board as the application processor, or a separate semiconductor device mounted on a different board as the application processor. More specifically, FIGS. 2A and 2E show power consumptions diagrams for screen refresh operations, which is typically performed fifty times per second by the application processor. FIGS. 2B and 2F show power consumption diagrams for the operations of sending out "Keep Alive" messages to maintain a network connection with a wireless network, which is typically sent out every five to ten seconds. Particularly, FIG. 2B shows the power consumption for processing the operation with the application processor, and FIG. 2F shows the power consumption for processing the operations with the network processor 130 that is optimized for network functions. FIGS. 2C and 2G show power consumption diagrams for processing, for example, email downloading, which is processed by the application processor and the network processor, respectively. FIGS. 2D and 2H show overall sums of the power consumption for the operations shown in FIGS. 2A, 2B and 2C and FIGS. 2E, 2F and 2G, respectively.

While about the same amount of power may be consumed to process the operations processed by the main application in both instances shown in FIGS. 2A and 2E and FIGS. 2C and 2G, the power consumption for the network-related operations may be substantially reduced because the network processor consumes less power for a shorter period as shown in FIG. 2F than the application processor would normally require as shown in FIG. 2B. As shown in FIGS. 2D and 2H, this may substantially reduce the overall power consumption when the mobile device is in the standby mode, which may be about 90% to about 95% of the device operation time. Also, the longer the mobile communication device is in the standby mode, the more power may be saved by processing the network related operations with the network processor 130.

In an idle mode, for example, when no applications are running but the mobile communication device 100 is waiting for incoming calls, the application processor 110 may enter a sleep mode, leaving the task of updating the IMS network or any other wireless networks to the network processor 130. The application processor 110 may wake momentarily to refresh the display 166 as necessary. The network processor 130 may control the communication processors 122, 124, 126, 128 to generate and send IMS "keep-alive" packets, special SIP messages, to notify the networks 10, 20, 30, and/or 40 that the mobile communication device 100 is still connected thereto and ready for incoming calls or instant messages, or other IMS services the mobile communication device 100 has registered to, without awakening the application processor 110 and the FFOS. Furthermore, the network processor 130 may run a real-time operating system, such as Nucleus™ or VxWorks™, for example, and therefore the network processor 130 may enter to and exit from the sleep mode much more quickly than the application processor 110. Since the network processor 130 is required only for the network-related operations that may be processed at relatively low operating frequencies, the network processor 130 may be configured with a low-power CPU, in comparison to the application processor 110, which may process the network operations much more efficiently, quickly and at lower power.

According to a further aspect of the disclosure, the mobile communication device 100 may be configured with additional processors to further reduce operating frequencies and power consumption. In an embodiment, the mobile communication device 100 may be provided with dedicated processors optimized for specific applications rather than using general purpose CPUs. For example, the network processor 130 may be dedicated to control the communication processors 122, 124, 126, 128 for efficient processing of the network operations while the multimedia processor 140 may be dedicated to efficient processing of audio, video and graphics. Thus, embodiments of the disclosure may be beneficial for use with converged IP based networks that require low-power network processors with faster handling of IP packets, including packet encryption/decryption, and better sleep mode management to save battery life. Furthermore, in accordance with an embodiment of the disclosure, the networking and security aspects of TCP/IP processing may be controlled by the network processor 130, or other suitable processor, external to the application processor and its FFOS, thereby allowing them to enter the sleep mode when the mobile device is in the idle mode.

Although reference is made to certain specific wireless protocols, it is noted that any suitable wireless protocol may be used within the scope of the disclosure without departing from the scope or spirit of the disclosure. For example, Bluetooth, wireless LAN, WiMAX, Ultra Wideband (UWB) or any other known technology using a licensed or unlicensed frequency band may be used. Moreover, any future enhancement of a current protocol or any future protocol is contemplated for use with the disclosure.

Applications of the disclosure may not be limited to portable personal communications such as, for example, a cellular phone, a VoIP phone or PDA. Rather, the embodiments of the disclosure may be implemented for various other applications such as, for example, as shown in FIGS. 3 and 4, a telemetric vehicle fleet tracking system, a set-top box and the like.

Figure 3:
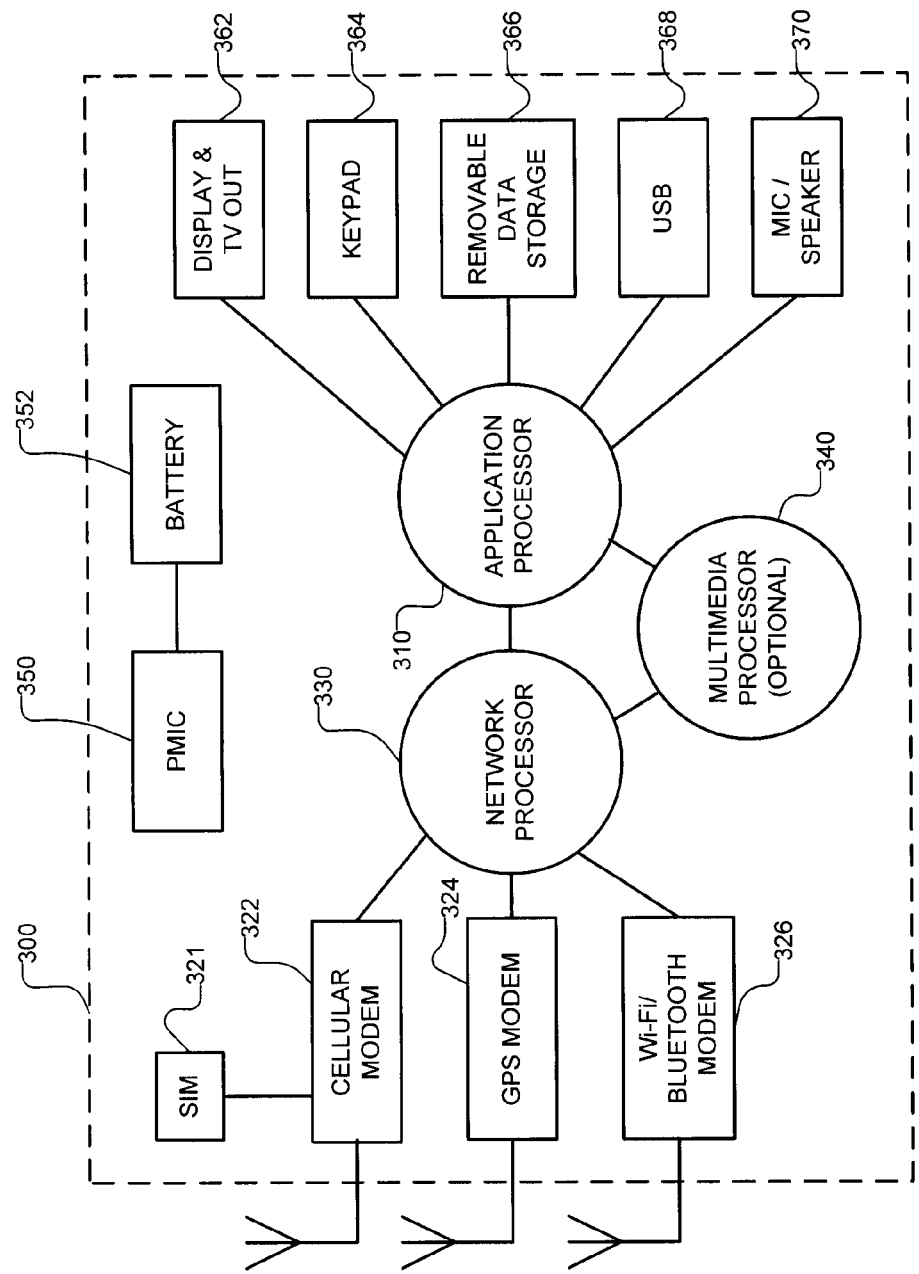
FIG. 3 shows an example of an application of the mobile communication device shown in FIG. 1 implemented in a vehicle tracking device, in accordance with an embodiment of the disclosure.
Figure 4:
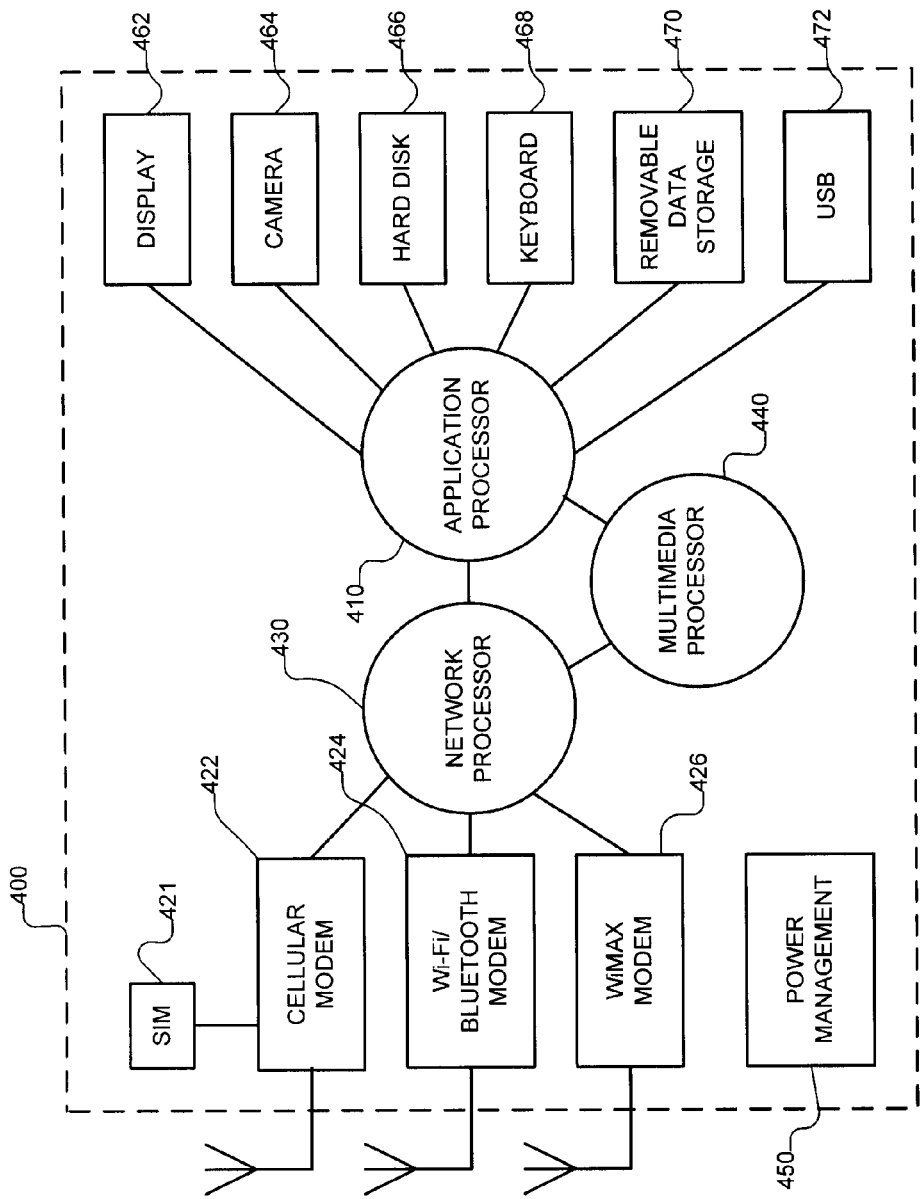
FIG. 4 shows an example of an application of the mobile communication device shown in FIG. 1 implemented in a set top box (STB) constructed in accordance with an embodiment of the disclosure.

Referring to FIG. 3, the vehicle fleet tracking system 300 may include an application processor 310, various communication processors, such as, a cellular modem 322, a GPS modem 324, a Wi-Fi/Bluetooth modem 326 and the like, a network processor 330, an optional multimedia processor 340, PMIC 350, a battery 352 and various peripheral devices, such as, a display/TV output 362, a keypad 364, a removable data storage 366, a USB port 368, a microphone/speakers 370, and/or the like. Further, a SIM 321 may be connected to the cellular modem 322.

In an embodiment, the GPS modem 324 and the network processor 330 may be configured to track and store the location of the vehicle over time. Particularly, the network processor 330 may communicate with the GPS modem 324 to collect vehicle location data from a GPS network 40 (shown in FIG. 1) and send the collected vehicle location data to the application processor 310, which runs a software application to process the vehicle location data for a vehicle navigation system, or the like.

Additionally, the network processor 330 may be configured to control the cellular modem 322, the GPS modem 324, the Wi-Fi/Bluetooth modem 326 and the like to perform various network-related operations in the vehicle fleet tracking system 300, such as, for example, packet routing and inspection, packet encryption and decryptions, key management, network registration and authentification, network roaming, monitoring and keep-alive management, network handover, RF coexistence management and/or the like.

In some implementations, the vehicle fleet tracking system 300 may include sensors (not shown), such as, for example, at least one of a temperature sensor, a pressure sensor, a rotational sensor, an airflow sensor or any other suitable sensor, depending on a particular application, as the skilled artisan will appreciate, without departing from the scope or spirit of the invention. Moreover, the vehicle fleet tracking system 300 may output one or more output control signals, such as, for example, but not limited to, one or more engine operating parameters, one or more transmission operating parameters, and/or other control signals.

Referring to FIG. 4, the disclosure may be implemented in a set-top box (STB) 400, also known as a home gateway, to deliver, for example, multimedia content, including Internet-based content. In an embodiment, the STB 400 may include an application processor 410, various communication processors, such as, a cellular modem 422, a Wi-Fi/Bluetooth modem 424, a WiMAX modem 426 and the like, a network processor 430, a multimedia processor 440, a power management unit 450 and various peripheral devices, such as, a display/TV out 462, a camera 464, a hard disk 466, a keyboard 468, removable data storage 470, a USB port and/or the like. Further, a SIM 421 may be connected to the cellular modem 322.

As mentioned above, the network processor 430 may be configured to control the cellular modem 422, the Wi-Fi/Bluetooth modem 424, the WiMAX modem 426 and the like to perform various network-related operations in the STB 400, such as, for example, packet routing and inspection, packet encryption and description, key management, network registration and authentification, network roaming, monitoring and keep-alive management, network handover, RF coexistence management and/or the like. Although the STB 400 is typically powered by an outlet and hence may not be battery-operated, the embodiments of the disclosure may still be applied thereto for reducing power consumption and avoid system overheating.

Figure 5:
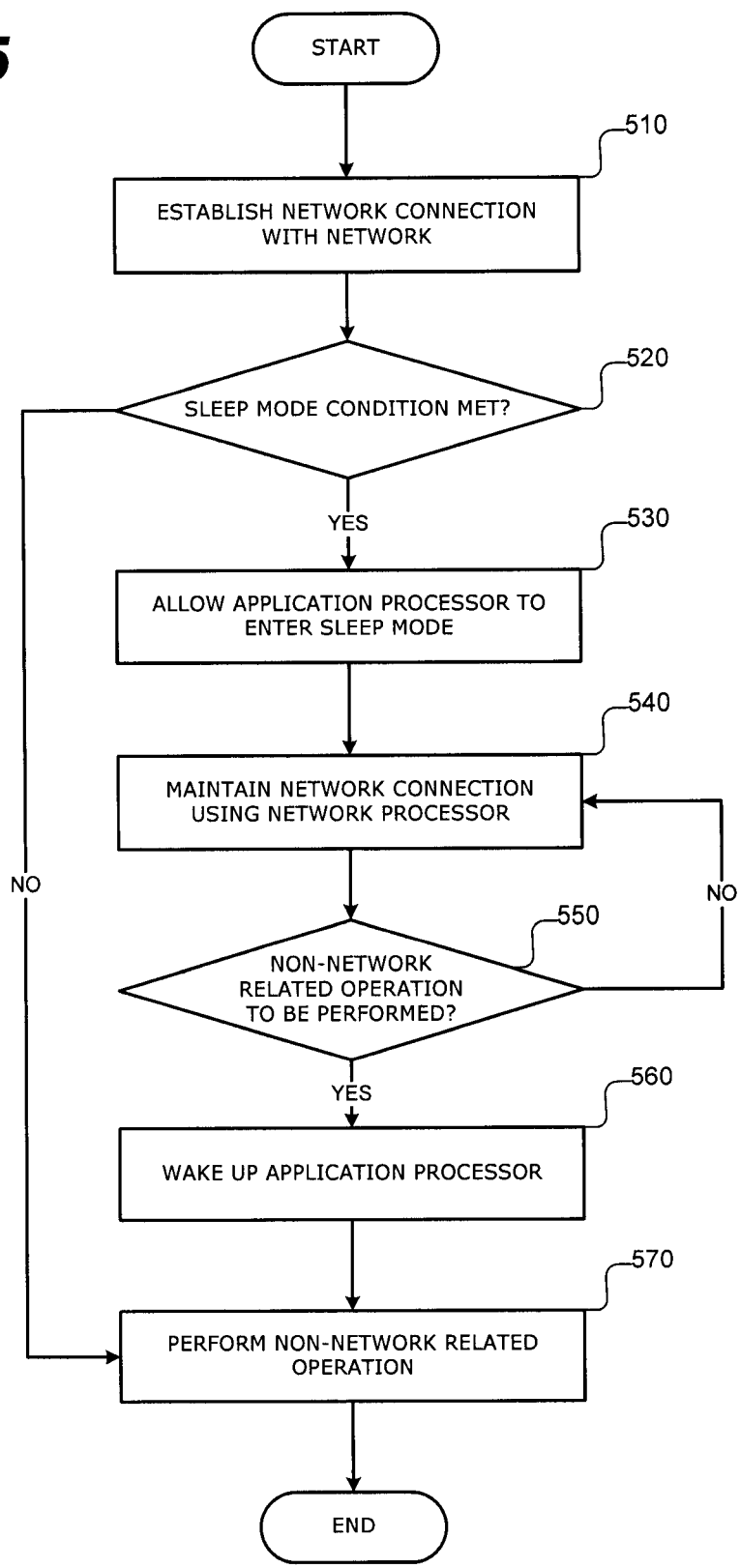
FIG. 5 shows a flow chart of a process for maintaining a network connection between a mobile communication device and a wireless network using a network processor, in accordance with an embodiment of the disclosure.

FIG. 5 shows a flow chart of a process for maintaining a network connection between a mobile communication device (such as, for example, the mobile communication device 100 shown in FIG. 1) and a wireless network (such as, for example, the wireless networks 10, 20, 30 or 40, shown in FIG. 1) using a network processor (such as, for example, the network processors 130, 330, or 430 shown in FIGS. 1, 3 and 4, respectively) in accordance with an embodiment of the disclosure. Upon starting the process, a network connection may be established between a mobile communication device and a wireless network at 510. The communication device may be configured such that certain predetermined conditions (e.g. inactivity for a certain period of time, a specific user instruction, or the like) may trigger the communication device to enter a sleep mode. When such predetermined conditions are met at 520, the mobile communication device may allow an application processor to enter a sleep mode at 530; otherwise, the process moves to 570, where the application processor may perform non-network related operations. While the application processor is in the sleep mode, the network processor may control communication processors to maintain the connectivity between the mobile communication device and the connected network without awaking application processor at 540. The details of maintaining the network connectivity have been described above with reference to FIG. 1. When it is determined that there is a call or another non-network related operation (e.g., play music, capture images, stream video, play games, download emails, transfer files, browse the Internet, or the like) that requires an operation of the application processor at 550, the mobile communication device may awaken the application processor at 560; otherwise, the network processor may maintain the network connectivity at 540 without waking up the application processor. Upon waking up, the application processor may perform the non-network related operations at 570.

In accordance with an embodiment of the disclosure, a computer readable medium may be provided that contains an executable program embedded therein for performing the process shown in FIG. 5. In particular, the computer readable medium may include a code section for each of the operations or processes 510, 520, 530, 540, 550, 560 and 570 shown in FIG. 5, which, when executed by, for example, a general purpose computer device, will cause the computer device to carry out each of the operations or processes 510, 520, 530, 540, 550, 560 and 570 shown in FIG. 5.

FIG. 6 shows a flow chart of a process for performing a hand-off operation from one wireless network type to another (such as, e.g., from a cellular network to a wireless LAN network) using a network processor, such as the network processors 130, 330, 430 shown in FIGS. 1, 3 and 4, respectively, in accordance with an embodiment of the disclosure. Upon starting the process, a mobile communication device (such as, e.g., the mobile communication device 100 shown in FIG. 1) may establish a network connection with a first wireless network of a first wireless network type at 610 (such as, e.g., the wireless networks 10, 20, 30 or 40 shown in FIG. 1). For example, the first wireless network may be a cellular network covering a user's residential area. As mentioned above, establishment and maintenance of the network connection may be operated by the network processor.

The network processor may control communication processors to perform a roaming function to detect other available wireless networks at 620 without necessitating the application processor to be woken up. When there is another wireless network of a different network type (e.g., a wireless LAN network in the user's home) at 630, the network processor 640 may under predetermined conditions, for example, sufficiently good reception in conjunction with necessary permissions, control the communication processors to establish another network connection with the newly detected wireless network of the different network type. If there is no other wireless network available at 630, the process may go back to 620 to continue roaming to detect availability of other networks. When it is determined that the current activity (e.g., a voice call, data downloading, or the like) established between the mobile communication device and the first wireless network should be handled by the newly available network type at 650, the network processor may control the communication processors to perform a hand-off operation at 660 to handle the current activity via the newly established network connection, without any drop or interruption of a communication stream (such, e.g., the voice call, the data downloading, or the like). If the hand-off is not necessary at 650, the process may go back to 620 to continue roaming to detect availability of other networks.

In accordance with an embodiment of the disclosure, a computer readable medium may be provided that contains an executable program embedded therein for perform the process shown in FIG. 6. In particular, the computer readable medium may include a code section for each of the operations or processes 610, 620, 630, 640, 650 and 660 shown in FIG. 6, which, when executed by, for example, a general purpose computer device, will cause the computer device to carry out each of the operations or processes 610, 620, 630, 640, 650 and 660 shown in FIG. 5.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A mobile communications device, comprising:
a first processor of the mobile communications device configured to control an operation of a peripheral device;
at least one second processor of the mobile communications device configured to transport data between the mobile communications device and at least one wireless network that is external to the mobile communications device, the at least one second processor being configured to maintain a network connection between the mobile communications device and the at least one wireless network based upon a periodically received command to maintain the network connection, the at least one second processor comprising a plurality of modems, each modem configured to transport data between the mobile communications device and a different wireless network; and
a third processor of the mobile communications device connected between the first processor and the at least one second processor, the third processor being configured to direct the at least one second processor to execute a network operation to maintain the network connection independently of the first processor without awaking the first processor from a sleep mode, the network operation including the at least one second processor periodically sending a message to the at least one wireless network that is external to the mobile communications device to maintain the network connection between the mobile communications device and the at least one wireless network, the third processor being configured to direct the at least one second processor to maintain the network connection by periodically transmitting the command to maintain the network connection from the third processor to the at least one second processor at a predetermined time interval.

2. The mobile communications device of claim 1, being connected to a plurality of the peripheral devices, wherein the first processor is configured to control the plurality of peripheral devices.

3. The mobile communications device of claim 1, the peripheral device being selectable from a group comprising at least one of a keypad, a microphone, a speaker, a display, a camera, a removable data storage and a USB port.

4. The mobile communications device of claim 1, the at least one second processor being configured to transport data between the mobile communications device and at least one of a cellular network, a wireless LAN network, a WiMax network, a Bluetooth network and a GPS network.

5. The mobile communications device of claim 1, wherein the message comprises a Session Initiation Protocol data packet.

6. The mobile communications device of claim 1, the at least one second processor being configured to encrypt or decrypt the data packet.

7. The mobile communications device of claim 1, the at least one second processor being configured to execute an authentication operation between the mobile communications device and the at least one wireless network.

8. The mobile communications device of claim 1, the at least one second processor being configured to perform a roaming function to detect a new wireless network available for communication with the mobile communications device.

9. The mobile communications device of claim 1, the at least one second processor being configured to perform a registering operation of the mobile communications device to a new wireless network available for communication with the mobile communications device.

10. The mobile communications device of claim 1, the at least one second processor being configured to perform a handoff operation from a network of a first network type to another network of a second network type.

11. The mobile communications device of claim 10, wherein the first network type comprises one of a cellular network, a wireless LAN network, a WiMax network, a Bluetooth network and a GPS network, and the second network type comprises another network type thereof.

12. The mobile communications device of claim 1, the at least one second processor being configured to perform a handover operation from one network to another network.

13. The mobile communications device of claim 1, the at least one second processor being configured to perform an RF coexistence maintenance operation.

14. The mobile communications device of claim 1, the at least one second processor being configured to monitor a link quality between the mobile communications device and the at least one wireless network.

15. The mobile communications device of claim 14, the at least one second processor being configured to register to a new network based on the monitored link quality.

16. The mobile communications device of claim 14, the at least one second processor being configured to register to a new network based on the monitored link cost.

17. The mobile communications device of claim 1, the at least one second processor being configured to monitor a link cost between the mobile communications device and the at least one wireless network.

18. A method for maintaining a network connection between a mobile communications device and a wireless network, comprising:
 establishing a network connection between the mobile communications device and the wireless network, wherein the wireless network is external to the mobile communications device;
 allowing a first application processor of the mobile communications device, which controls operations of at least one peripheral device, to enter a low power mode when the mobile communications device is in an idle state; and
 maintaining the network connection with the external wireless network using a third network processor of the mobile communications device to control a second communication processor of the mobile communications device for sending periodic messages to the external wireless network to maintain the network connection between the mobile communications device and the external wireless network without awakening the first application processor of the mobile communications device from the low power mode, wherein the third network processor is connected between the first application processor and the second communication processor, wherein the second communication processor comprises a plurality of modems, each modem configured to transport data between the mobile communications device and a different external wireless network, wherein maintaining the network connection includes:
 periodically transmitting a command from the third network processor of the mobile communications device to the second communication processor of the mobile communications device at a predetermined time interval that commands the second communication processor of the mobile communications device to send the periodic messages to the external wireless network.

\* \* \* \* \*